United States Patent [19]

Morys

[11] Patent Number: 5,790,432
[45] Date of Patent: Aug. 4, 1998

[54] UNIVERSAL MEASURING INSTRUMENT WITH SIGNAL PROCESSING ALGORITHM ENCAPSULATED INTO INTERCHANGEABLE INTELLIGENT DETECTORS

[75] Inventor: Marian Morys, Philadelphia, Pa.

[73] Assignee: Solar Light Company, Inc., Philadelphia, Pa.

[21] Appl. No.: 570,680

[22] Filed: Dec. 11, 1995

Related U.S. Application Data

[60] Provisional application No. 60/002,611, Aug. 21, 1995, abandoned.

[51] Int. Cl.$^6$ .................................................. G01D 18/00
[52] U.S. Cl. ........................... 364/571.04; 364/571.01; 364/271.02; 364/571.07; 324/115
[58] Field of Search ..................... 364/271.07, 579, 364/580, 571.01, 571.02, 571.03, 571.04, 571.05, 571.06, 571.08, 550, 483; 324/115, 157

[56] References Cited

U.S. PATENT DOCUMENTS

| | | | |
|---|---|---|---|
| 4,418,392 | 11/1983 | Hata | 364/571.01 |
| 4,537,516 | 8/1985 | Epstein | 374/1 |
| 4,608,532 | 8/1986 | Ibar et al. | 324/115 |
| 4,672,306 | 6/1987 | Thong | 364/550 |
| 4,764,879 | 8/1988 | Campbell | 364/571.08 |
| 4,963,820 | 10/1990 | Medlin | 324/115 |
| 5,089,979 | 2/1992 | McEachern et al. | 364/571.07 |
| 5,162,725 | 11/1992 | Hodson et al. | 324/115 |
| 5,227,988 | 7/1993 | Sasaki et al. | 364/709.01 |
| 5,347,476 | 9/1994 | McBean, Sr. | 364/571.07 |

*Primary Examiner*—Eric W. Stamber
*Attorney, Agent, or Firm*—Caesar, Rivise, Bernstein, Cohen & Pokotilow, Ltd.

[57] ABSTRACT

A meter (10) is capable of use with a plurality of different sensor heads (16, 16b). The reading meter (12) includes a digital display (20), a processor (22) and memory (23), and an analog-to-digital converter (ADC 41). Each different sensor head includes a memory (32a) which carries at least the processing algorithm for the particular sensor. In operation, the reading meter (12) reads the detector head memory (32a), and loads the information so read into its processor memory (23). The raw sensor data is converted to digital form, and processed in accordance with the stored algorithm, to produce the desired display. In one embodiment, the detector head memory (32a) is read, and the information is serially coupled to the reading meter. In another embodiment, the serial data is converted to optical signals (634) for transmission. The processor memory (23) may include other data which is held in semipermanent storage, such as calibration data for an ADC within the reading meter, and housekeeping information for the display (20). A count-down counter (52) in each sensor head is preprogrammed with a number representing the number of days remaining in the calibration period, and is decremented daily.

11 Claims, 8 Drawing Sheets

FIG. 4

| Dec Code | Mnemonic | Parameters following | Description |
|---|---|---|---|
| 0 | X_END | | Finish processing, return a floating point number from the top of the stack or 0 if none available |
| 1 | X_GETNUM | 4 bytes real number | Place the following number on stack |
| 2 | X_GETA | | Get the voltage at Input A(14a on FIGURE 1) and put it on the stack |
| 3 | X_GETB | | Get the voltage at Input B(14B on FIGURE 1) and put it on the stack |
| 4 | X_JMPGT | 1 byte offset | Jump "offset"bytes ahead if the top value on the stack is greater than the previous one; otherwise skip the offset and continue execution |
| 5 | X_JMPLT | 1 byte offset | Jump "offset"bytes ahead if the top value on the stack is lesser than the previous one; otherwise skip the offset and continue execution |
| 6 | X_JMP | 1 byte offset | Jump offset bytes ahead (counting from the position of the command code); X_JMP 0 causes indefinite loop |
| 7 | X_ADD | | Add the top to the previous; remove both from stack; put the result on the top |
| 8 | X_SUB | | Substract the top from previous (previous-top); remove both; put the result on the top |
| 9 | X_MUL | | Multiply the top by previous; remove both; put the result on the top |
| 10 | X_DIV | | Divide previous by top (previous/top); remove both; put the result on the top |
| 11 | X_SQRT | | Calculate the square root of the top; remove top and put the result on the top |
| 12 | X_INV | | Calculate the reciprocal of the top (1/top); remove the top; put the result on the top |
| 13 | X_POWER | 1 byte exponent | Raise the top to the "exponent" power; remove top: put the result on the top |
| 14 | X_NEG | | Change the sign of the operand on the top of the stack: keep the result on the stack |
| 15 | X_DUP | | Duplicate the number on the stack |
| 16 | X_LN | | Natural logarithm of the top of the stack |
| 17 | X_STORE | | Store the top of the stack in a temporary cell; leave the stack unchanged |
| 18 | X_RECALL | | Restore the number from a temporary cell and add it to the top of the stack |

| BYTE NUMBER | CODE (DECIMAL) | MNEMONIC | COMMENT |
|---|---|---|---|
| 1. | 2 | X_GETA | Put the voltage from channel A on the stack |
| 2. | 1 | X_GETNUM | Put on stack the floating point number that follows this operation code (0.004 in this case) |
| 3. | 111 | | First byte of a number 0.004 as a standard representation of a single precision floating point number in a computer system (4 bytes) |
| 4. | 18 | | second byte of the floating point number representation |
| 5. | 131 | | third byte of the floating point number representation |
| 6. | 59 | | fourth byte of the floating point number representation |
| 7. | 8 | X_SUB | Subtract the top of the stack (0.004) from the preceding number (Voltage1); also removes both operands from stack and puts the result on stack. The top of the stack now contains: (Voltage1-0.004) |
| 8. | 1 | X_GETNUM | Put on stack the floating point number that follows this operation code (2.5 in this case) |
| 9. | 0 | | First byte of a number 2.5 as a standard representation of a single precision floating point number in a computer system (4 bytes) |
| 10. | 0 | | second byte of the floating point number representation |
| 11. | 32 | | third byte of the floating point number representation |
| 12. | 64 | | fourth byte of the floating point number representation |
| 13. | 9 | X_MUL | Multiply two top numbers on the stack, remove the operands from stack and place the result on the top of the stack. The top of the stack now contains; (Voltage1-0.004) * 2.5 |
| 14. | 0 | X_END | End the processing and return the number on the top of the stack as a result |

FIG. 5

| | B7 | B6 | B5 | B4 | B3 | B2 | B1 | B0 |
|---|---|---|---|---|---|---|---|---|
| 1 | \multicolumn{8}{l|}{NEXT - pointer to the next DDM, 0 if last in list} |
| 2 | \multicolumn{4}{l|}{SOURCE (0-15)} | \multicolumn{4}{l|}{TYPE (0-15)} |
| 3 | \multicolumn{2}{l|}{SIZE (0-3)} | \multicolumn{6}{l|}{Y0-Y coord of the lower left corner} |
| 4 | \multicolumn{8}{l|}{X0-X coord of the lower left corner} |
| 5 | \multicolumn{5}{l|}{WIDTH-(0-32)} | \multicolumn{3}{l|}{DECIMAL (0-7)} |
| 6 | \multicolumn{8}{l|}{additional information depending on SOURCE and TYPE} |
| 7 | \multicolumn{8}{c|}{-//-} |
| 8 | \multicolumn{8}{c|}{-//-} |

First DDM starts at a fixed location in detector memory. Consecutive DDM's, if any, are pointed to by a single byte pointer NEXT.
The last DDM in a list has the value of NEXT assigned to zero.

| | B7 | B6 | B5 | B4 | B3 | B2 | B1 | B0 |
|---|---|---|---|---|---|---|---|---|
| 1 | \multicolumn{8}{l|}{NEXT - pointer to the next DDM, 0 if last in list} |
| 2 | \multicolumn{4}{l|}{SOURCE (0-15)} | \multicolumn{4}{l|}{TYPE (0-15)} |
| 3 | \multicolumn{2}{l|}{SIZE (0-3)} | \multicolumn{6}{l|}{Y0-Y coord of the lower left corner} |
| 4 | \multicolumn{8}{l|}{X0-X coord of the lower left corner} |
| 5 | \multicolumn{5}{l|}{WIDTH-(0-32)} | \multicolumn{3}{l|}{DECIMAL (0-7)} |
| 6 | \multicolumn{8}{l|}{additional information depending on SOURCE and TYPE} |
| 7 | \multicolumn{8}{c|}{-//-} |
| 8 | \multicolumn{8}{c|}{-//-} |

| | B7 | B6 | B5 | B4 | B3 | B2 | B1 | B0 |
|---|---|---|---|---|---|---|---|---|
| 1 | \multicolumn{8}{l|}{NEXT = 0 last DDM in the list} |
| 2 | \multicolumn{4}{l|}{SOURCE (0-15)} | \multicolumn{4}{l|}{TYPE (0-15)} |
| 3 | \multicolumn{2}{l|}{SIZE (0-3)} | \multicolumn{6}{l|}{Y0-Y coord of the lower left corner} |
| 4 | \multicolumn{8}{l|}{X0-X coord of the lower left corner} |
| 5 | \multicolumn{5}{l|}{WIDTH-(0-32)} | \multicolumn{3}{l|}{DECIMAL (0-7)} |
| 6 | \multicolumn{8}{l|}{additional information depending on SOURCE and TYPE} |
| 7 | \multicolumn{8}{c|}{-//-} |
| 8 | \multicolumn{8}{c|}{-//-} |

FIG. 7

| SOURCE code | Source of the information to be displayed by the DDM |
|---|---|
| 0 | The information to be displayed follows the DDM header, i.e. the first byte of the information is located in the 6-th byte of the DDM. The length of the information is determined based on the contents of the TYPE field. |
| 1 | The measurement result is to be displayed. The measurement result is returned by the signal processing algorithm 326 (FIGURE 3) |
| 2 | The current date is to be displayed if real time clock is implemented in the meter. The format is: month/day/year |
| 3 | The current time is to be displayed if real time clock is implemented in the meter. The format is: hour:minutes:seconds |

FIG. 8

| TYPE code | Format of the displayed information |
|---|---|
| 0 | Decimal representation of a 4-byte floating point number. The format of the displayed information is affected by the values of WIDTH and DECIMAL. |
| 1 | Hexadecimal representation of the 4-byte long integer |
| 2 | Binary representation of the 4-byte long integer |
| 3 | Floating point number presented in a form of an analog bar. The length of the bar increases with increasing value of the number. The number has to be normalized to 1 by the signal processing algorithm 326, i.e. 1 shows full scale. |

FIG. 9

UNIVERSAL MEASURING INSTRUMENT WITH SIGNAL PROCESSING ALGORITHM ENCAPSULATED INTO INTERCHANGEABLE INTELLIGENT DETECTORS

Priority is claimed of Provisional patent application Ser. No.60/002,611, filed Aug. 21, 1995, now abandoned.

FIELD OF THE INVENTION

This invention relates to universal measuring instruments or meters which use interchangeable detectors, and more particularly to those instruments in which the detectors carry the algorithms required to process the sensor output signal, such as for linearization and offset correction.

BACKGROUND OF THE INVENTION

Electronic measuring instruments are commonly used to measure and display a wide variety of parameters, such as voltages, temperature, pressure, speed, frequency, acceleration, sound intensity, and illumination levels, to name a few. Such measuring instruments commonly include a sensor which generates an analog signal having a magnitude which varies in accordance with variations in the parameter being measured. While such analog signals can be used to directly drive analog display meters, it is now common to convert the analog signal, using an analog-to-digital converter, into a digital signal which can be displayed digitally on a display panel. An engineer or technician who is required to measure a variety of different parameters such as those listed above ordinarily requires a corresponding number of measuring instruments. However, the cost of maintaining a separate measuring instrument for each type of parameter to be measured can be significant. Many electronic measuring instruments in current use include a gain amplifier positioned between the sensor and the analog-to-digital converter. For use with some sensors, the gain amplifier must be calibrated for zero signal strength (offset adjustment) and for full-scale signal strength (gain adjustment) in order to achieve reliable measurements or reading. Most electronic measuring instruments must be recalibrated periodically in order to assure accurate measurements. A calibration laboratory normally maintains a log of the date on which each measuring instrument was last calibrated, and the date on which the next calibration is due. Unless the calibration log is reviewed on a schedule, it may happen that an instrument will continue to be used beyond its scheduled recalibration date, which results in readings which may be in error. Also, particular types of sensing elements can produce electrical signals representing the measured parameter, which electrical signals vary in different ways for a given change in the parameter being measured. For example, a temperature sensitive element might produce an electrical voltage that varies linearly with changes in the temperature being measured. By contrast, a pressure sensitive element might generate its signal in the form of an electrical resistance which ideally varies in accordance with a quadratic formula. Accordingly, for a measuring meter designed to be used with different types of sensors, it is necessary to know the type of sensor which is in use at any particular time in order to determine the best algorithm for computing the measured value. This requirement, however, limits the possibility of use of new types of sensors or detectors with a meter which does not recognize the sensor.

SUMMARY OF THE INVENTION

Briefly described, and in accordance with a preferred embodiment thereof, the present invention relates to an instrumentation system which includes a meter with a central processor for computing a measurement of one or more parameters such as temperature, pressure, voltage or the like. Most generally, the meter is arranged to accept a number of different sensor modules or detector heads (detectors). In order that the meter may be used with any detector, each detector carries a memory which includes information about the detector sensor, including the processing algorithm, and the display formatting information, which must be used to process the raw sensor reading for display or recording. As a result, any meter according to the invention can make use of any detector head, even a detector head designed after the manufacture of the meter itself, and measuring parameters unknown at the time of the fabrication of the meter. This is a distinct advantage over conventional meter/detector arrangements, in which the meter itself contains a memory preprogrammed with algorithms for all of the detectors known at the time of its manufacture. In one embodiment of the invention, the detector head memory not only includes the algorithm required for processing of the raw sensor reading, but it also includes information relating to the units and characters which are to be displayed by the meter. This is necessary, since the meter displays, if limited to only those known by the meter, might not be appropriate to a new type of sensor. In an embodiment of the invention, the memory within the detector head is a commercially available two-terminal unit which includes the keep-alive battery, and which responds to a serial digital data stream.

More particularly, a display is coupled to the central processor for numerically displaying the measurement computed by the central processor. The instrumentation system also includes interchangeable sensor modules or detectors which are adapted for use with the meter, with each sensor module being designed to sense a parameter such as temperature, pressure, voltage or the like, and to provide an output signal indicative of the parameter being sensed. Some of the sensor modules include a sensor for the main parameter to be measured, and other auxiliary sensors, such as temperature sensors, which are used to process the raw signal to compensate for the auxiliary parameter. A coupling mechanism is provided for selectively coupling one of the sensor modules to the measuring meter, to measure and display the parameter being sensed by the selected sensor module. The coupling mechanism mechanically couples the sensor module to the meter, and couples the output signal provided by the selected sensor module to the measuring meter. In addition, the coupling mechanism may also provide supplemental information to the measuring meter, as described below. In a first embodiment, each sensor module provides a processing algorithm to the measuring meter, which includes not only the general characteristics of the class of sensors, but which also incorporates within the algorithm the calibration information for the particular sensor associated with the sensor module, so that when the algorithm is applied to the raw sensor data, a signal is obtained which represents the actual value of the sensed parameter. For example, if the selected sensor module is a temperature sensor, its on-board memory might store an algorithm which includes coefficients which, when the algorithm is applied to the sensed signal, provides temperature-representative signals which are corrected for the nonlinearities and other vagaries of the particular temperature sensor, based upon the prior calibration of the sensor under known or laboratory-controlled conditions. The measuring meter accesses, from the temperature sensor module memory, the algorithm, with its inherent correction, as previously stored in the sensor module, and uses such information to calculate the sensed temperature. The memory on-board each sensor module is preferably a CMOS random access memory (RAM) with a battery backup which stores the data in a nonvolatile manner, and allows the memory to be changed when desired, to include recalibration data values. An electrically erasable, programmable memory can also be used. Such recalibrations, of course, may be performed at desired intervals.

In a particular embodiment of the invention, the memory located in the detector head is arranged to produce serial digital data rather than parallel data, so that the cable extending between the sensor head and the measuring meter can have a smaller number of conductors, which in turn advantageously reduces the bulk and stiffness of the cable. In yet another embodiment of the invention, a fiber-optic cable is used to transmit the data.

DESCRIPTION OF THE DRAWING

FIG. 4 tabulates the decimal values of codes which can be used in one embodiment of the invention, together with mnemonics, the following parameter, if any, and short descriptions of the functions commanded by the codes;

FIG. 5 tabulates an example of a step-by-step solution of an equation using the system of FIG. 4;

FIG. 7 is an example of tabulated Display Descriptor Modules which may be stored in memory for controlling various aspects of the display, and which contain SOURCE and TYPE fields;

FIG. 8 illustrates an example of the SOURCE field coding; and

FIG. 9 illustrates an example of the TYPE field coding.

DESCRIPTION OF THE INVENTION

Figure 1:
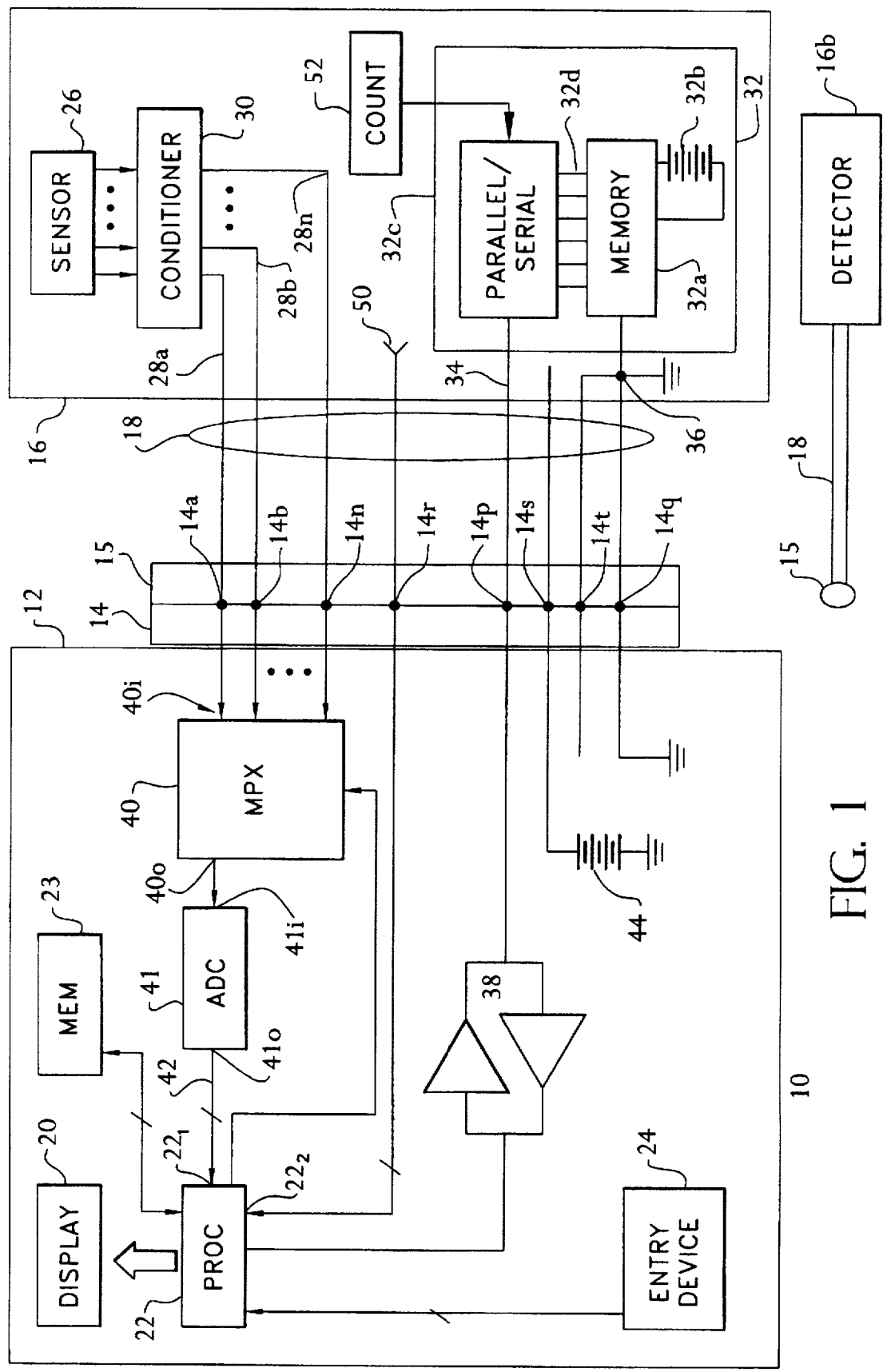
FIG. 1 is a simplified block diagram of an instrumentation system according to the invention, including a display meter, and two detector heads which may be used with the display meter.

FIG. 1 is a simplified block diagram of a system according to the invention. In FIG. 1, a meter 10 includes a meter body, display meter, or reading device 12 with a meter body connector 14, a detector or sensor head 16, and an interconnecting cable 18 terminating in a connector 15 which mates with meter body connector 14. Reading device 12 includes a display 20, which may be a liquid-crystal display which displays alphanumerics. Display 20 receives control signals from a central processor 22 and associated memory system 23, under the control of programs, as described below. An entry device 24, such as a keyboard, is mounted on the body of reading device 12, and is connected to processor 22. A battery-operated power supply illustrated as a battery 44 is provided within the body of reading device 12.

Detector head 16 of FIG. 1 includes a sensor 26, which may be, for example, any type of stimulus sensor for sensing an environmental or other condition. Examples may include temperature, infrared, ultraviolet, pH, and the like, which produce one or more analog output signals on a plurality of analog output lines or conductors $28a \ldots 28n$. These analog signals are, if necessary, applied to signal conditioners such as amplifiers, voltage dividers, dc restorers, or the like, illustrated as an array 30. Of course, any particular element of signal conditioner array 30 may be simply a direct wire connection from the sensor output to the output of conditioner array 30. The conditioned signals from array 30 are applied to corresponding analog signal carrying conductors $28a-28n$ of cable 18, and coupled through connector 15 to terminals $14a \ldots 14n$ of meter connector 14 of reading device 12.

The analog signals coupled from cable 18 and cable connector 15 through connector 14 of FIG. 1 are applied to the input terminals $40i$ of a many-to-one analog multiplexer 40, which multiplexes the input signals one at a time to its output port $40o$. The multiplexed signals are applied from port $40o$ to an input port $41i$ of an analog-to-digital converter (ADC), illustrated as a block 41. Multiplexer 40 allows any one of the analog signals on conductors $14a-14n$ of mated connectors 14 and 15 to be coupled to the input of the single ADC 41. The digital signals produced by ADC 41 are coupled from its output port $41o$ to a port $22_1$ processor 22 for use therein. Thus, the analog signals generated by the sensor 26 of detector 16 are converted to the more easily processed digital form before further processing. Digital signals may be applied to processor 22 by way of a parallel conductor set extending from terminals $14r$ to port $22_2$ of processor 22.

Power supply 44 of reading device 12 of FIG. 1 is connected to a terminal $14s$ of connector 14, and through the corresponding conductor of cable 18 to detector 16, in which the power is made available to the sensor, if necessary, and to the conditioner 30. The actual power connections are not illustrated in detector 16 of FIG. 1.

A memory device illustrated as a dashed block 32 in FIG. 1 is a read-write random access memory, which may be a simple RAM with an associated keep-alive battery. As illustrated, memory 32 includes a RAM $32a$ and a keep-alive battery $32b$. In order to keep the number of conductors in the cable 18 to a minimum, the memory signals are not transmitted as parallel signals, but are instead transmitted as serial data, which requires only a single conductor 34 extending through the cable. The conversion between parallel and digital signal formats is performed by a converter illustrated as a block $32c$, which is connected by parallel paths $32d$ to memory $32a$, and connected to conductor 34 (and to a common conductor 36). It is convenient to use a combination of memory $32a$, battery $32b$, and converter $32c$, sold as a single unit, MODEL DS1994, by Dallas Semiconductor Company, 4401 South Beltwood Parkway, Dallas, Tex. 75244-3292. This memory, it should be noted, does not receive power from battery 44 of the reading device 12, and it retains its data so long as its internal battery $32b$ provides power. Memory 32 requires only two conductive connections to couple data between memory $32a$ and external devices such as reading device 12, which connections are designated 34 and 36. Conductor 36 is grounded, and signal conductor 34 and the ground conductor are carried through cable 18 and connector 15 to terminals $14p$ and $14q$, respectively, of connector 14. The signal on conductor 34 is coupled from the associated terminal of connector 14 to a bidirectional buffer designated generally as 38, which is coupled to processor 22.

In the preferred embodiment of the invention, memory 32 of FIG. 1 is preprogrammed with information relating to the algorithm, corrected for the particular sensor 26 currently in use, which processor 22 is to use in converting the sensed signal applied to its input ports $22_1$ or $22_2$ into signals usable by the display, and also includes information which enables a generic "dumb" display to produce all the desired information, together with the presentation format (decimal, binary, hexadecimal, graph, bar, icons, and the like), and also information relating to the position of the result on the display, the sizes of the characters used to display the result, the maximum width of the display space allocated for the presentation of the result, the position of the decimal point and commas, if any, and the annunciators such as dimensions, and the like. The amount of information will, of course, be limited by the amount of storage space available in memory 32, but the use of data compression, and improved memories, enables large amounts of data to be stored even with present technology. For some purposes, it is desirable to store the algorithm in memory 32 in microprocessor language, because this allows maximum flexibility in controlling the functions of processor 22 to perform the algorithm. On the other hand, this requires that the person programming the sensor have the microprocessor language ready at hand, and program in a relatively complex manner. The use of simpler codes makes the programming of the memory 32 in detector 16 easier, but may limit the ability to utilize all the capabilities of processor 22.

Memory 23 of FIG. 1 includes a plurality of pages in which data may be stored. Some of the pages are blank, and are available for storage of algorithm data, as described below. Other pages of memory 23 are preprogrammed with information relating to the devices which are located within reading device 12. A particular piece of information which may be included within memory 23 is calibration data for ADC 41, which may be used to correct the digital signal generated in response to an analog signal input. Another piece of information which may be included, but which is not absolutely mandatory if the detector memory 32 contains the information, relates to the characteristics of the digital display 20.

Memory device 32 of detector head 16 of FIG. 1, as so far described, has only two conductors external data conductors, and is internally maintained or nonvolatile. It is responsive to signals received over the single conductor 34 (relative to ground), to store and recall data. The pulses which it recognizes are in the form of serial words. Commands and data are sent to the memory, and from the memory, in the form of serial bits making up bytes. The least significant bit in each byte is sent first. Processor 22, acting as a master during the transmission, synchronizes the data transfer based upon the sharp slope generated by pulling the data line low. A certain time after the slope, the voltage on the line is sampled to get one bit of information. The data, then, is transferred during time slots, which are independently timed, so that pauses in the transmission of data can occur without errors.

A further multiconductor set of terminals designated 14r in FIG. 1 is coupled to a further parallel digital input port of processor 22, for receiving parallel digital signals from a detector which provides digital data instead of analog data. As illustrated in FIG. 1, this set of conductors is simply terminated at a point 50 within analog detector 16, and the conductors are not used, because the analog signals are coupled from sensor 26 by way of conductors 28a–28n and terminals 14a–14n, rather than by way of terminals 14r.

Figure 2:
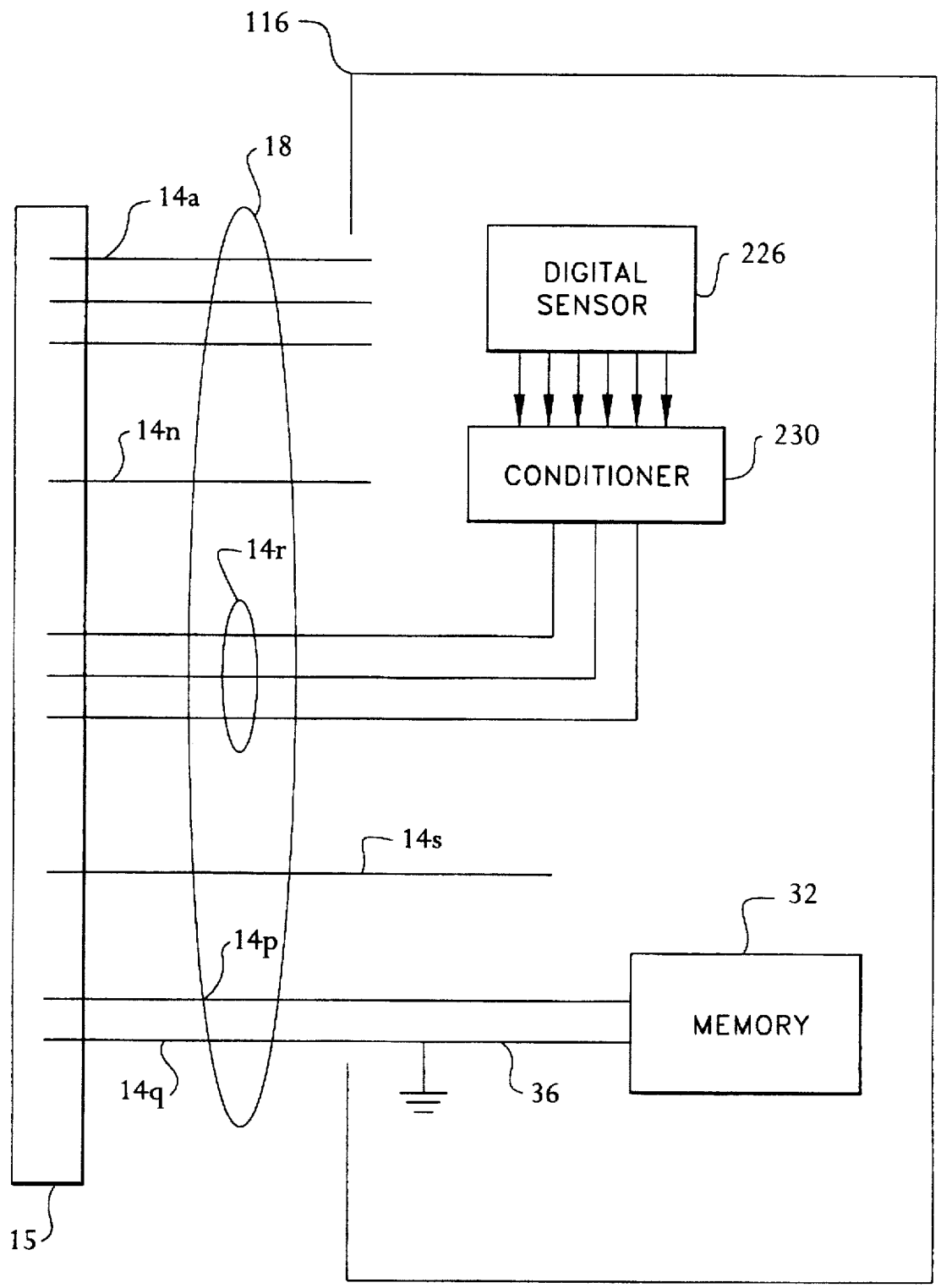
FIG. 2 is a simplified block diagram of a detector head of FIG. 1 which uses a digital sensor, and which may be used with the instrumentation system of FIG. 1.

FIG. 2 is a simplified block diagram of a detector 116 which produces digital signals, rather than analog signals, in response to an environmental stimulus. In FIG. 2, sensor 226 may be a simple thermostatic switch, which makes or breaks a contact when the temperature is above a particular temperature. An array of such contacts makes a digital temperature sensor. Similarly, commercially available sensors may be purchased which are analog sensors coupled with an ADC, which therefore also produce digital signals. In general, a conditioner will not be required for such a digital sensor, but a further driver or conditioner 230 may be used if desired. Some common standard for the digital signals must be adopted for the interface between the detector 16 and the reading device 12. One standard which is available is the digital information standard SDI-12 bus. The digital information is coupled from conditioner 230 over multiconductor set 14r to processor 22 of FIG. 1. When addressed, memory 32 of FIG. 2 supplies data to processor 22 indicating that data at port $22_2$, originating from digital sensor 226, is to be used, rather than information at processor port $22_1$.

Figure 3:
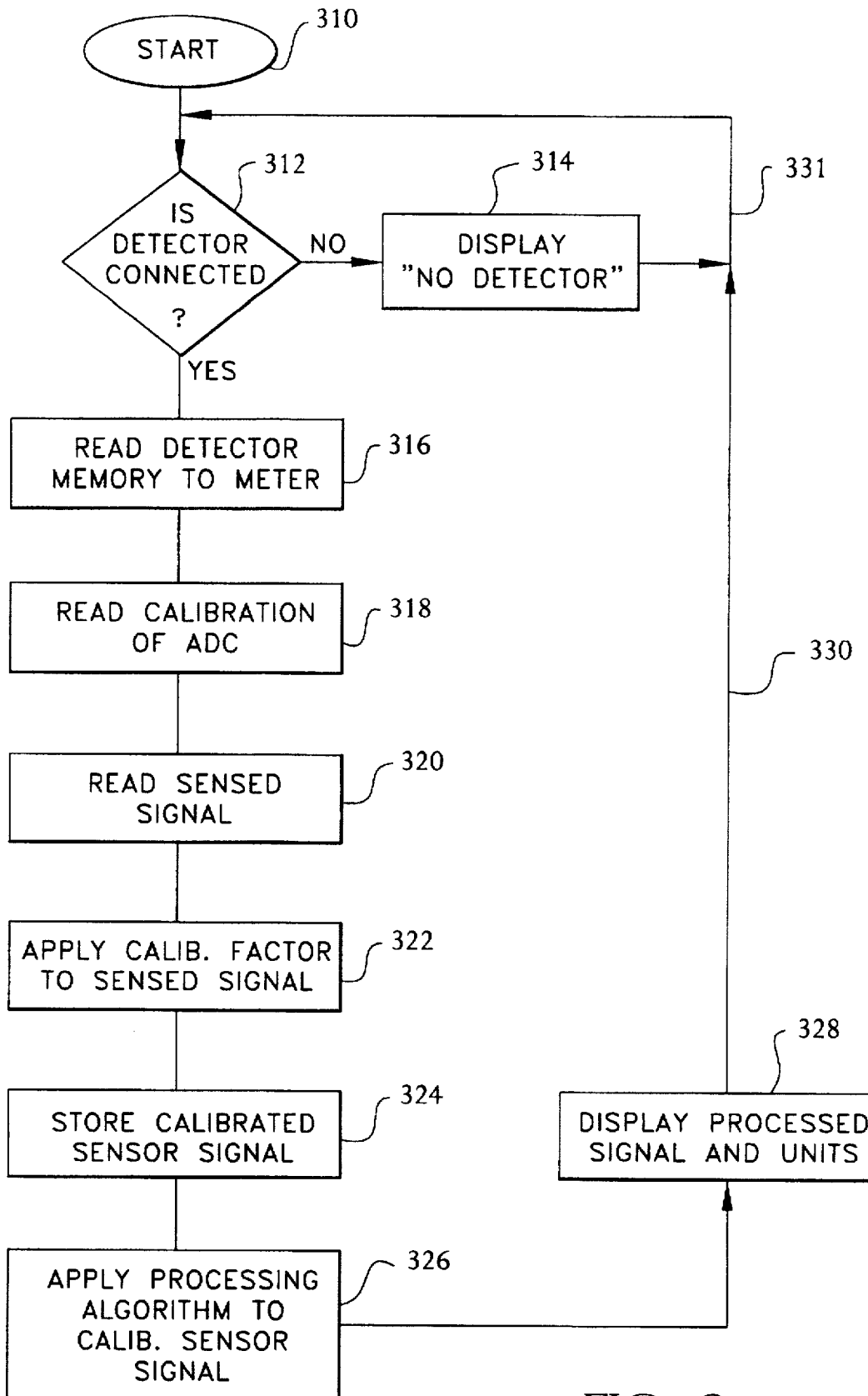
FIG. 3 is a simplified overall flow chart illustrating the overall operation of the arrangement of FIG. 1 as including the reading of the detector head memory, reading the sensor data, and processing the raw sensor data according to the appropriate algorithm.

The flow chart of FIG. 3 represents the overall operation of the meter of FIG. 1. In FIG. 3, the logic begins at a START block 310, and proceeds to a decision block 312, which determines whether or not a detector is connected to the meter. This may be done by repeatedly addressing memory 32, for example, and by looking for a response; a simpler way is to connect the microprocessor 22 to a terminal 14t of FIG. 1, and to ground the corresponding conductor in detector 16, whereupon microprocessor 22 determines the presence of a detector by a logic low level at terminal 14t. If a detector is not connected to the meter, the logic leaves decision block 312 of FIG. 3 by the NO output, and proceeds to a block 314, which represents commanding the display of "NO DETECTOR" or the like on the display 20 of FIG. 1. From block 314, the logic returns to decision block 312 by logic path 331. A timer may be inserted into this path, to cause the loop to cycle at one Hertz (Hz.), ten Hz., or some other rate.

Eventually, a detector will be found by the logic loop of blocks 312 and 314 of FIG. 3, and the logic will leave decision block 312 by the YES logic output. From block 312, the logic flow arrives at a block 316, which represents the sending of commands to the detector memory 32 of FIG. 1, and the transfer of the data therein to a page (a portion) of processor memory 23. This allows the processor 22 to easily access the sensor signal processing algorithms, without having to access the detector memory 32 each time data is required, and waiting for the serial data. With the algorithm and other data stored in a page of memory 23 of FIG. 1, the logic of FIG. 3 flows to a block 318. Block 318 represents the reading of calibration data for ADC 41 from memory 23, and block 320 represents the reading of the sensed signal from ADC 41. Block 322 represents the application of the calibration data to the sensed signal, to produce a digital signal which represents the value of the analog signal applied to ADC 41, corrected for the errors of ADC 41. This is typically only a multiplication.

From block 322 of FIG. 3, the logic flow proceeds to a block 324, which represents the temporary storing of the calibrated sensor signal in memory 23 of FIG. 1. From block 324, the logic flows to a block 326, which represents the application of the processing algorithm to the stored calibrated sensor signal, to produce a signal to be displayed. From block 326, the logic flows to a further block 328, which represents application of the signal to be displayed to display 20 of FIG. 1, together with the presentation format (decimal, binary, hexadecimal, graph, bar, icons, and the like), and also information relating to the position of the result on the display, the sizes of the characters used to display the result, the maximum width of the display space allocated for the presentation of the result, the position of the decimal point and commas, if any, and the annunciators or units information such as dimensions, and the like. From block 328, the logic returns to decision block 312 by way of logic paths 330 and 331.

In one embodiment of the invention, after the analog signals are read, microprocessor 22 of FIG. 1 executes a call to the signal processing algorithm, transferred from detector memory 32 and temporarily stored in memory 23, which is directly coded in microprocessor language. The algorithm is executed, and the result is placed in another memory location, in readiness for display in the format specified by the display portion of the stored data. In another embodiment of the invention, which is suitable for use with a detector memory 32 having limited storage capacity, the signal processing algorithm is stored as a series of operation codes, known as Reverse Polish Notation (RPN), which operates on a stack of organized data. The meter's processor 22 interprets the codes and performs the assigned operations to implement the algorithm. This type of operation requires that the processor recognize the codes, which means that the codes must be defined in processor memory 23 of FIG. 1. This approach, even though it requires some storage in memory 23, is very memory efficient, and allows complex algorithms to be stored in small detector memories 32. One system of such codes which has been found to be useful is tabulated in FIG. 4.

In FIG. 4, the left column represents decimal value of the various RPN codes which are stored in memory 23 of FIG. 1, together with their corresponding microprocessor-language translations which perform the actual commands. Each code is a one-byte numeral. A total of 21 codes are used in this embodiment, so a five-bit byte suffices to carry any code value. Each five-bit code numeral can be followed by an operand taking the form of a floating-point number, four bytes in length, or taking the form of an integer number, one byte in length, ranging in value from 0 to 255. Decimal code 0 of FIG. 4 represents the end of processing. The result of the processing algorithm is the floating point number on the top of a processing stack, if available, and a zero if a finite value is not available. Decimal code 1 commands the placement of the following (or associated) four-byte real number on the stack. Decimal code 2 represents the acquisition of the voltage from input A (14a in FIG. 1) and placing it on the stack, while decimal code 3 represents the same for input B (14b in FIG. 1).

Codes 4 and 5 of FIG. 4 represent conditional jumps. They are capable of modifying the sequence of program execution steps depending on the relation of the two top numbers on the data stack. Command codes 4 and 5 are followed by a one byte OFFSET parameter. Jump instructions do not modify the data stack. Code 4 represents transferring the flow of the program to the command located OFFSET bytes ahead, in relation to the currently executed command code, if the top value on the stack is greater than the previous value, otherwise continues execution with the next command code. An offset is represented by a one byte number so the jump range is 0 to 255 bytes. Code 5 performs the same function as code 4, except it functions if the top value on the stack is less than the previous byte. Code 6 of FIG. 4 unconditionally transfers the control to the command code located OFFSET bytes ahead, in relation to the currently executed command.

The command codes 7 to 16 of FIG. 4 represent arithmetic operations. All arithmetic is performed on 4-byte-long floating point numbers. Code 7 represents the step of adding together the two top values on the stack, removing the two top values from the stack, and putting the result of the addition on the top of the stack. Code 8 represents the subtraction of the value of the top number on the stack from the preceding value, removal of both, and placement or substitution of the result at the top of the stack. Code 9 represents multiplication of the two top values in the stack, removal of both, and placing the result at the top of the stack. Code 10 is similar, except that it divides the previous value by the top value. Code 11 represents calculation of the square-root of the top value on the stack, and substitution of the result into the stack. Code 12 represents calculation of the inverse (the number one divided by the value) of the top number on the stack, and substitution of the result for the top number. Code 13 is associated with a one-byte exponent (0 to 255). Code 13 represents raising the value of the number at the top of the stack to the indicated power, and substitution of the result onto the top of the stack. Code 14 changes the sign of the operand at the top of the stack. Code 15 replicates the number at the top of the stack, and places the replicated number on top of the stack. Code 16 takes the natural logarithm of the value at the top of the stack, and substitutes the result therefor. Code 17 temporarily stores the number currently at the top of the stack, for later use, while leaving the stack unaffected. Lastly, code 18 takes the number temporarily stored in response to code 17, and places it at the top of the stack. Many more arithmetic operations, such as sine, exponent etc. can be added, if desired, to create a comprehensive set of functions, thereby simplifying the detector programming.

FIG. 5 represents the successive bytes required to perform a sample calculation using the codes of FIG. 4. The sample calculation implements the equation $$Result=(Voltage\_A-0.004)*2.5$$

The resulting contents of the program memory would be as indicated in FIG. 5. In FIG. 5, byte 1 is decimal code 2, representing fetching of the voltage from channel A, and placing it on the stack. Byte 2 is decimal code 1, representing the placing on the stack of the floating-point number immediately following the command code. In this case, the floating-point number will be 0.004. The floating-point number is represented by the third, fourth, fifth and sixth bytes, according to IEEE 754 single precision standard. At this point in the calculation, the top value on the stack is 0.004, and the previous value is the original voltage from channel A. Byte seven is code 8, which commands subtraction of the top of the stack from the previous value in the stack, and substitution of the result (Voltage\_A−0.004) at the top of the stack. Byte 8 of FIG. 5 is code 1, representing placing the following number on the stack, which will be the number 2.5. Bytes 9 through 12 represent the number 2.5 according to IEEE 754 standard. The number 2.5 is now at the top of the stack, and (Voltage\_A−0.004) is the preceding number in the stack. Byte 13 is code 9 which represents the multiplication of the two top numbers in the stack, to give the desired result. The result is placed at the top of the stack. Byte 14 contains code 0, which terminates the program execution and returns the result of the program located at the top of the stack. This simple example indicates how the Reverse Polish Notation, in conjunction with a stack configuration of the processor, can provide processing in response to simple commands; the example required only fourteen bytes of detector memory to convey the complete algorithm.

Figure 6:
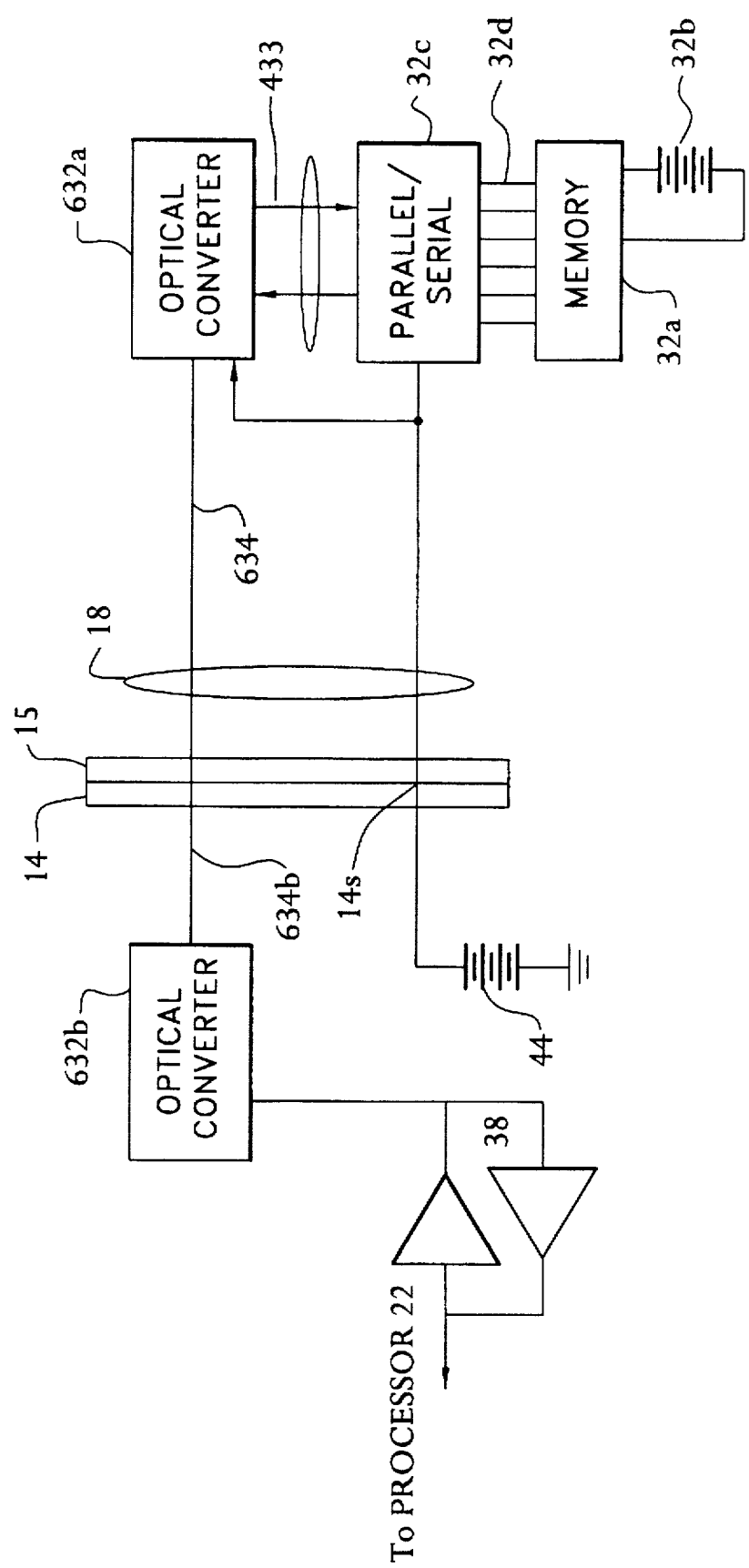
FIG. 6 is a simplified block diagram of a portion of an arrangement similar to that of FIG. 1, in which the serial data is transmitted by an optical signal path.

FIG. 6 illustrates a portion of another embodiment of the invention, which is similar to the arrangement of FIG. 1, except for the indicated portions. The arrangement of FIG. 6 differs from the arrangement of FIG. 1 in that the serial data which is transmitted to and from detector memory 32a is transmitted over an optical fiber cable, for reduced dimensions and rigidity of cable 18. As illustrated in FIG. 6, parallel-to-serial converter 32c is connected by two separate serial data paths 433, one for each direction of data flow, to a bidirectional electrooptical converter 632a. Converter 632a is connected by means of an optical fiber 634 to a corresponding optical connector set of mating connector array 14/15, and through another optical fiber 634b to a second bidirectional electrooptical converter 632b, which ultimately couples the data to and from processor 22 of FIG. 1, either with or without bidirectional drivers 38.

According to another aspect of the invention, a countdown counter 52 located in detector 16 of FIG. 1 is preprogrammed with a particular value at the time the detector head is calibrated, which number represents the number of days for which the calibration is valid. Counter 52 is decremented each day by a clock associated with the counter, to indicate the number of remaining days during which the calibration is valid. The current value of counter 52 is coupled to parallel-to-serial converter 32c, so that the current number of remaining days is conveyed to the processor together with the other data. Processor 22 can use the information in many ways, as by storing the counter value along with the logged information which is downloaded to a computer system for further analysis. A zero value of the counter results in an "out-of-calibration" message on the display. This avoids the need for a real-time clock in the display meter, and also avoids the need to compare a date code to a real-time clock signal.

The detector memory 32 of FIG. 1 can also store the codes describing the presentation of the measurement, and annotations as desired, on the display 20. In one implementation of the invention, the display formatting information can be organized as a linked list of Display Description Modules (DDM). FIG. 7 shows an example of a list of three DDM's. Each DDM consists of at least 5 bytes, each with 8 bits of information (B0 to B7). The first 5 bytes of the DDM constitute the DDM header. The first byte of each DDM contains a pointer (named NEXT in FIG. 7) to the next DDM, if any. The pointer is the offset, in bytes, between the beginning of the current DDM and the beginning of the next DDM. If NEXT is zero then this is the last DDM in the list. Each DDM controls the presentation of one piece of information, such as the measurement reading, the units descriptor, or the name of the detector. The processor 22 of FIG. 1, while executing the procedure of block 328 in FIG. 3, browses through the linked DDM list, starting from the first DDM, interprets the Display Description Modules, and places the individual pieces of information on display 20 of FIG. 1. After the last element of the DDM list is processed, the display update is complete, and the logic of the flow chart of FIG. 3 returns program control to decision block 312 by way of paths 330 and 331.

The second byte of each DDM of FIG. 7 is divided into two 4-bit-long nibbles, one containing the SOURCE code, describing the source of the information to be displayed, the other containing the TYPE code, describing the type of information (decimal number, hexadecimal number, alphanumeric, etc.). FIG. 8 shows an example of the SOURCE field coding, and FIG. 9 the coding of TYPE field. The four bit fields allow for sixteen different codes to be stored, consequently sixteen different sources of information and sixteen different types can be defined.

The third byte of each DDM of FIG. 7 contains SIZE, the 2-bit character size code and Y0, the Y coordinate of the lower left corner of the display area designated for displaying the information. The fourth byte of DDM contains X0, the X coordinate of the lower left corner of the display area designated for displaying the information. Specifying the size of characters and the location of information within the display makes more efficient use of display area, and a clear presentation of measurement results is possible. The display formatting information is stored in the detector's memory 32 and is associated with the signal processing algorithm.

The WIDTH and DECIMAL fields are stored in the 5th byte of each DDM of FIG. 7. The WIDTH value determines the width of the display window allocated for displaying the information. It's interpretation depends on the data type. For numbers and alphanumerics it is expressed in characters. For graphic presentations it can be expressed in pixels or multiples of pixels. The DECIMAL field is relevant to the decimal presentation of a number. The DECIMAL value specifies the position of the decimal point in the window determined by the coordinates of the lower left corner and the WIDTH field.

Thus, one aspect of the invention lies in a metering apparatus or meter 10 which includes a reading device 12 adaptable for use with any one of multiple detector or sensing heads 16. The reading device 12 includes (a) an electrical meter connector 14 including an analog signal terminal 14a and a digital signal terminal 14p. The reading device 12 also includes (b) analog-to-digital converter 40, 41 with an input port 40i coupled to the analog signal terminal 14a . . . 14n, and also with an output port 41o at which digital signals are generated which are equivalents of analog signals applied to the input port 40i of the analog-to-digital converter 40, 41. The reading device 12 of meter 10 further include microprocessor 22 including ports for input signals $22_1$, $22_2$ and ports for output signals, (d) digital signal coupling means 38, 42 coupled to at least one of the ports $22_1$ of the microprocessor 22, to the digital signal terminal 14p of the meter 10, and to the output port 41o of the analog-to-digital converter 40, 41, for coupling digital signals to and from the microprocessor 22. The meter further includes (c) a meter memory 23 coupled to the microprocessor 22 for temporarily storing digital information including microprocessor instructions, and (d) a display 20 coupled to the microprocessor 22 for displaying information in response to commands from the microprocessor 22. The apparatus also includes at least one of (B) a plurality of sensing heads 16, 16b. Each of the sensing heads includes (a) a sensor connector 15 adapted to mate with the meter connector 14; the sensor connector includes an analog signal terminal 14a and a digital signal terminal 14p. Each sensing head also includes (b) a sensor 26 for sensing an environmental stimulus, and for generating analog sensor signals in response thereto; the sensor signals are coupled to the analog signal terminal of the sensor connector 15. (c) A sensor head memory 32 is provided, which is preprogrammed with a processing algorithm which defines the processing to be performed on the sensor signals to generate a desired output display, and (C) a read enabling arrangement (22, 32, flowchart) is coupled to the meter 12 and to that one of the sensor heads 16 which is coupled to the meter connector 14, for enabling the microprocessor 22 to read the sensor head memory 32, and to load at least the processing algorithm into the meter memory, and for enabling the microprocessor to execute the algorithm on at least the sensor signals, and to display the result of the execution.

In another embodiment of the invention, the detector memory 32 is preprogrammed with a multiplicity of processing algorithms and Display Description Module lists in separate memory areas. The user of the meter, by means of the entry device 24, can command the microprocessor means to select a particular processing algorithm and corresponding DDM list. An example of this feature is user selectable unit conversion. For instance, a reading from a temperature sensor can be displayed in degrees Celsius or Fahrenheit. Each presentation will have a separate processing algorithm associated with appropriate DDM list. The processing algorithm will generate an appropriate number, corresponding to temperature in degrees Celsius or Fahrenheit, while the corresponding DDM will command the microprocessor means to display the number and appropriate units on the meter's display.

In yet another embodiment of the invention at least part of the detector memory 32 is both read-write. In this read-write area the meter can store flags describing current settings specific for the detector, such as an indication of the currently selected processing algorithm. When the detector is next connected to the reading device, the last setup will be restored automatically showing the preferred presentation of the measurement results to the user. Other uses of the read-write memory may be storage of additional, user defined, correction factors or alarm thresholds for implementing the alarm system in the meter.

Other embodiments of the invention will be apparent to those skilled in the art. For example, the many-to-one multiplexer described in conjunction with block 40 of FIG. 1 may be sequenced automatically, so that the digital signals are generated in sequence, and may update processor 22 automatically. While an internal battery 44 has been illustrated, an external source may, of course, be used.

What is claimed is:

1. A metering apparatus including a meter adaptable for use with any one of multiple sensing heads, said apparatus comprising:
   (A) a meter including;
     (a) an electrical meter connector including an analog signal terminal and a digital signal terminal;
     (b) analog-to-digital converting means including an input port coupled to said analog signal terminal, and including an output port at which digital signals are generated which are equivalents of analog signals applied to said input port of said analog-to-digital converting means;
     (c) microprocessing means including ports for input signals and ports for output signals;
     (d) digital signal coupling means coupled to at least one of, said ports of said microprocessing means, to said digital signal terminal of said meter, and to said output port of said analog-to-digital converting means, for transmitting digital signals to and from said microprocessing means;
     (e) a meter memory coupled to said microprocessing means for temporarily storing digital information including microprocessor instructions; and
     (f) a display coupled to said microprocessing means for displaying information in response to commands from said microprocessing means;
   (B) a plurality of sensing heads, each of said sensing heads including:
     (a) a sensor connector adapted to mate with said meter connector, and including an analog signal terminal and a digital signal terminal;
     (b) a sensor for sensing an environmental stimulus, and for generating analog sensor signals in response thereto, said analog sensor signals being transmitted to said analog signal terminal of said sensor connector;
     (c) a sensor head memory preprogrammed with a processing algorithm which defines the processing to be performed on signals originating from said sensor to generate a desired output display, said processing algorithm being downloaded to said meter memory; and
   (C) read enable means coupled to said meter and to that one of said sensing heads which is coupled to said meter connector, for enabling said microprocessing means to read said sensor head memory, and to load at least said processing algorithm into said meter memory, and for enabling said microprocessing means to execute said processing algorithm on at least said signals originating from said sensor, and to display on said display means the result of said execution.

2. A metering apparatus according to claim 1, wherein said read enable means coupled to said meter and to that one of said sensing heads which is coupled to said meter connector, for enabling said microprocessing means to read said sensor head memory, includes parallel-to-serial conversion means coupled to said sensor head memory, for converting parallel signals from said sensor head memory into serial signals for transmittal to said meter.

3. A metering apparatus according to claim 1, wherein said sensing head further includes a count-down counter preprogrammed with a number representing the number of days remaining in the current calibration validity period, which count-down counter decrements by one count each day; and
   said count-down counter is coupled to said parallel-to-serial conversion means, for transmitting said number representing the number of days remaining to said parallel-to-serial conversion means, whereby the serial form of said number representing the number of days remaining is transmitted to said meter.

4. A metering apparatus according to claim 1, wherein said analog-to-digital converting means comprises:
   many-to-one analog multiplexing means including an input port coupled to said analog signal terminal, and an output port to which said analog signals are transmitted in turn; and
   an analog-to-digital converter including an analog input port coupled to said output port of said many-to-one multiplexing means, and also including an output port at which digital signals are generated which are equivalents of analog signals applied to said input port of said analog-to-digital converter.

5. A metering apparatus according to claim 1, wherein said digital signal coupling means further comprises:
   bidirectional buffer means coupled to at least one of said ports of said microprocessing means and to said digital signal terminal of said meter; and
   a parallel signal path coupled to a port of said microprocessing means and to said output port of said analog-to-digital converting means, for coupling digital signals to said microprocessing means from said analog-to-digital converting means.

6. A metering apparatus according to claim 1, wherein said sensor head memory is read-only.

7. A metering apparatus according to claim 1, wherein said sensor head memory is preprogrammed with a plurality of said processing algorithms, and further comprising;
   command entry means coupled to said microprocessing means, for commanding said microprocessing means to load a particular one of said plurality of said processing algorithms into said meter memory.

8. A metering apparatus according to claim 1, further comprising rewriteable sensor head memory means located in each of at least some of said sensor heads, for temporarily storing flags indicative of the last-used configuration of said sensor head.

9. A method for making measurements using a universal meter and any one of a plurality of sensor heads, said meter including a connector, a microprocessor and a display, and each of said sensor heads including a mating connector, a sensor for outputting a plurality of sensor signals, and a memory preprogrammed with an algorithm defining the processing required to convert said sensor signals into corrected data, said method comprising the steps of:

connecting said connector of said meter to said mating connector of one of said sensor heads, to thereby establish electrical connections between said meter and said one of said sensor heads;

reading said preprogrammed algorithm from said memory of said sensor head to a microprocessor memory;

reading said sensor signals from said sensor to said microprocessor;

in said microprocessor, processing said sensor signals in accordance with said algorithm, to generate a result; and displaying said result on said display.

10. A method according to claim 9, wherein said step of reading said algorithm from said memory of said sensor head to said microprocessor memory includes the steps of:

reading said algorithm from said memory of said sensor head in parallel form;

converting said algorithm from said parallel form to serial form;

after said step of converting said algorithm from said parallel to said serial form, transmitting said algorithm in said serial form through said connector and said mating connector to said microprocessor.

11. A method according to claim 9, further comprising the steps of:

at the time of calibration of said sensor head, preprogramming a count-down counter associated with said sensor head with a number representative of the number of days remaining until the end of the calibration period;

each day, decrementing said number representative of the number of days remaining; and in conjunction with said step of processing said sensor signals, providing an out-of-calibration indication in the event that the count in said count-down counter has reached zero.

\* \* \* \* \*